July 16, 1940.  C. O. HANSON  2,208,292

ROTARY JOINT

Filed July 8, 1938

Inventor
Clifford O. Hanson
By
Attorney

Patented July 16, 1940

2,208,292

UNITED STATES PATENT OFFICE 2,208,292

ROTARY JOINT

Clifford O. Hanson, Tiffin, Ohio, assignor to The Hanson Clutch and Machinery Company, Tiffin, Ohio, a corporation of Ohio Application July 8, 1938, Serial No. 218,231

5 Claims. (Cl. 285—97.6)

This invention relates to rotary joints, and particularly to a joint for conducting pressure fluids between relatively rotative parts.

One object of the invention is to provide a rotary joint of the type referred to wherein the pressure of the fluid conducted is utilized to maintain a fluid tight seal between members of the joint connected, respectively, with a non-rotative part and a rotative part.

Another object of the invention is to provide in a joint of the type referred to packing means functioning as one wall of a chamber subject to fluid pressure, which packing means is so disposed with respect to the non-rotative and rotative parts of the joint that rotation will not be imparted to such packing means, and the life and effective functioning of the same thus materially enhanced.

A further object of the invention is to arrange the packing means and its support in such relation to the non-rotative and rotative parts as to provide sealing means for preventing escape of pressure fluid from the joint.

A still further object is to provide multiple fluid sealing means, including pairs of complemental sealing surfaces functionally responsive to the pressure of the fluid conducted to prevent its leakage from the joint.

The invention contemplates a sealing joint for conduits for conducting pressure fluid between a non-rotative part and a rotative part, including a casing member having an axial bore terminating in a sealing surface, a conduit member rotative with respect to said casing member and extending into the bore thereof, said casing member and conduit member being relatively axially movable, and the conduit member provided with a seating surface complemental to that of the bore, and packing means including a gland member within the bore and normally abutting against the end of the conduit member and axially apertured to pass pressure fluid between the casing member and the conduit member, said gland member being axially movable within the bore of said casing, and means for establishing pressure fluid reaction between said casing member and gland member to thereby force the complemental sealing surfaces into fluid sealing engagement. And the invention comprises, further, various details of construction and the cooperative arrangement of the parts of the joint, as will be explained hereinafter more fully and finally claimed.

Figure 1:
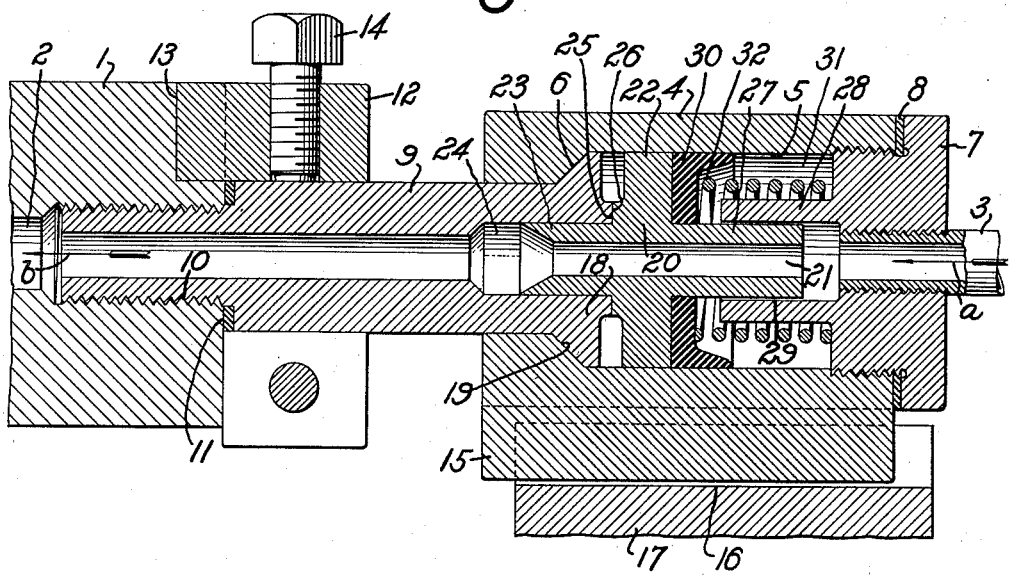
Figure 2:
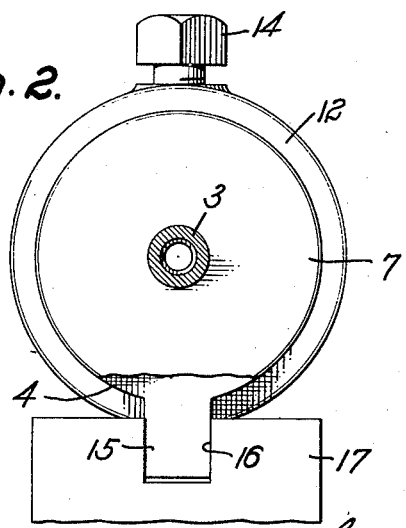

In the accompanying drawing illustrating the invention, in the figures of which like parts are similarly designated, Figure 1 is an axial section through a joint embodying the features of the invention and parts operatively associated therewith, and Fig. 2 is an end view, looking toward the left, Fig. 1, with parts broken away.

In the embodiment illustrated in Fig. 1 of the drawing, the joint of the invention is shown, for purposes of illustration, as applied to the end of the rotating shaft 1 of a machine, such as the constantly rotating shaft of a power shovel, to the axial bore 2 of which pressure fluid, such as oil, may be supplied through a suitable pipe 3, and through the joint, from a stationary compressor unit (not shown), to the fluid operated mechanism of a friction clutch mounted on the revolving shaft.

It will be apparent that in order for the pressure fluid to function effectively, there must be no appreciable leakage between the rotative and non-rotative parts of the joint, and as hereinbefore indicated, the joint of the invention is designed to prevent such leakage.

The joint comprises a casing member 4 having an axial bore 5 terminating at one end in a preferably chamfered or non-radial fluid sealing surface 6, and closed at its other end by a screw plug 7 which furnishes a means of connection for the pipe 3 and between which plug and the end wall of the casing is introduced an appropriate sealing washer 8.

A conduit member 9 is preferably rigidly screw-threaded at 10 into the bore 2 of the shaft 1 and is provided with a suitable sealing washer 11, and it may, if desired, be locked to the shaft 1 by a clamping collar 12 having a key 13 cooperating with the shaft 1 and a set screw 14 bearing against the conduit member 9. This conduit member 9, being thus rigidly assembled with the shaft 1, will rotate therewith, but the casing member 4 is held against rotation, but permitted to have appropriate axial movement, by means of a key or spline 15 engaging a suitable keyway or slot 16 in a plate 17 or other appropriate fixed member.

The conduit member 9 extends into the bore 5 of the casing member 4 and is provided with a shoulder 18 having a sealing surface 19 complemental to and cooperating with the sealing surface 6 of the casing. Obviously, relative axial movement of the casing member 4 and conduit member 9 will accomplish appropriate pressure fluid sealing contact between these complemental sealing surfaces 6 and 19.

Within and axially movable of the bore 5 of the casing member 4 is a gland member 20 provided with an axial aperture or bore 21 for the passage of pressure fluid, and having an annular piston-like portion 22 in relatively close sliding contact with the bore 5. An axial extension 23 of this gland member fits within the bore 24 of the conduit member 9, and abutting surfaces 25 and 26 on adjacent parts of the gland member and conduit member, respectively, provide a means whereby upon axial movement of the gland member 20 it may react against the conduit member 9. The opposite axial extension 27 of the gland member 20 has a non-fluid-tight fit within a sleeve 28 projecting inwardly from the plug 7, thus furnishing an annular passage 29 through which pressure fluid may escape into the bore 5. In order that the pressure fluid thus escaping through the passage 29 may not pass the annular portion 22 of the gland member 20, the gland member is provided with flexible or extensible sealing means 30, such as a resilient or rubber cup washer, thus providing in the bore 5 between the gland member 20 and the plug 7 a pressure chamber 31 in constant communication with the source of pressure fluid through the pipe 3 and passage 29.

It is to be noted that, due to this arrangement, all of the parts assembled within the bore 5 of the casing member 4, with the exception only of the shouldered end 18 of the conduit member 9, are inherently non-rotative, and hence there is no likelihood of wear of the packing member 30 and the wall of the bore 5, except such as may be occasioned by axial movement of the gland member within the bore.

A spring 32, or other appropriate resilient means, may be arranged within the chamber 31 and bearing against the plug 7 and packing 30 to react thereagainst and thus normally maintain the sealing surfaces 6—19 and 25—26, in appropriate engagement.

In operation, the joint functions as follows:— Pressure fluid entering the joint through the inlet pipe 3, in the direction of the arrow a, passes through the bore 21 of the gland member 20 and the bore 24 of the conduit member 9 and thence, as indicated by the arrow b, into the bore 2 of the shaft 1, and so to the parts to be operated by fluid pressure. The pressure fluid also passes through the passage 29 into the pressure chamber 31 where it reacts between the cup washer 30 and the plug 7 to force the skirt of the cup washer into intimate fluid sealing contact with the wall of the bore 5, at the same time causing relative movement between the casing 4 and the gland member 20 to cause the sealing surfaces 25—26 by their abutting engagement to force the sealing surfaces 6—19 into intimate fluid sealing engagement, the surfaces 25—26 establishing, at the same time, a pressure fluid seal.

Hence, the pressure fluid passing through the bores 21 and 24 cannot back up around the extension 23 and escape between the surfaces 25—26 into the bore 5, nor can the pressure fluid which enters the chamber 31 escape past the cup washer 30. In the event any pressure fluid does escape at either of these points, it will be held at the sealing joint provided by the chamfered or non-radial complemental sealing surfaces 6—19.

I am aware that numerous rotary joints have been provided for passing pressure fluid between a non-rotative and a rotative member, but in those with which I am familiar no provision is made for the multiple fluid sealing effect attained by the construction of the joint of my invention, nor is provision made for axial but non-rotative movement of packing elements similar to the cup washer 30, where such elements are employed. Furthermore, I am not aware of any similar joint wherein the packing means includes a separate packing-carrying member the equivalent of the normally non-rotative gland member 20.

It is to be noted that the higher the pressure of the fluid introduced into the joint, the more effective will be the seal of the joint against its escape. This is due in part to the fact that the cup washer 30 is not subjected to any appreciable wear, and hence maintains an effective seal of the chamber 31, and particularly to the fact that escape of the pressure fluid adjacent to the complemental sealing surfaces 6—19 being guarded against by the cup washer 30 and the rotary sealing surfaces 25—26, fluid under pressure is not likely to enter between the surfaces 6—19 and cause them to back away from each other and break sealing contact.

Although, in the foregoing, the invention has been described in its application to a power shovel installation, it is not to be understood that the invention is thus limited. On the contrary, it may be employed, generally, where a sealing joint for conduits for conducting pressure fluid between a non-rotative part and a rotative part is required.

Various changes and modifications are considered to be within the spirit of the invention and the scope of the following claims.

What I claim is:

1. A sealing joint for conduits for conducting pressure fluid between a non-rotative part and a rotative part, including a casing member and a conduit member relatively rotative, and capable of relative axial movement, said members provided with substantially radially-extending oppositely-facing complemental fluid sealing surfaces normally in contact, an apertured gland member within and normally non-rotative with respect to said casing member and contacting said conduit member and serving to conduct fluid between said casing member and conduit member, a packing member carried by said gland member and providing a fluid seal between said casing member and said conduit member, and means for subjecting said gland member and its packing to fluid pressure thereby to exert axial pressure between said casing member and conduit member to effect fluid sealing contact of said complemental sealing surfaces.

2. A sealing joint for conduits for conducting pressure fluid between a non-rotative part and a rotative part, including a non-rotative axially movable casing member and a rotative conduit member, said conduit member extending within said casing member and shouldered therein to provide a substantially radially-extending fluid sealing surface for cooperation with a complemental sealing surface in said casing member, said sealing surfaces seating in response to axial movement of said casing, an axially movable gland member normally bearing against the end of said conduit member, and means providing a fluid seal between said gland member and the inner wall of said casing, said sealing means being subject to the pressure of the conducted fluid to move said gland member and casing member relative axially and thereby seat said complemental sealing surfaces fluid tight.

3. A sealing joint for conduits for conducting pressure fluid between a non-rotative part and a rotative part, including a non-rotative axially movable casing member and a rotative conduit member, said casing member having its bore provided at one end with a substantially radially-extending fluid sealing surface and at its other end with a removable plug, said conduit member extending within the bore of said casing member and shouldered therein to provide a fluid sealing surface complemental to that of said casing member, an axially movable gland member normally abutting against said conduit member and having an annular portion providing a septum in said bore and opposite axial tubular extensions telescopically engaging said conduit member and plug respectively and serving to pass pressure fluid through said casing member and conduit member, and a packing member carried by said gland member and providing a fluid seal between said gland member and the bore of the casing member, said packing member being subject to the pressure of the conducted fluid to move said gland member and casing member relatively axially and thereby seat said complemental sealing surfaces fluid tight.

4. In a sealing joint for conduits for conducting pressure fluid between a non-rotative part and a rotative part, a casing member and a conduit member relatively rotative and relatively axially movable and provided respectively with substantially radially-extending oppositely-facing complemental pressure fluid sealing surfaces, a gland member arranged in said casing member and normally abutting against the adjacent end of said conduit member, and means for establishing pressure fluid reaction between said casing member and gland member to thereby force said pressure sealing surfaces into pressure sealing engagement.

5. In a sealing joint for conduits for conducting pressure fluid between a non-rotative part and a rotative part, a casing member and a conduit member relatively rotative and relatively axially movable and provided respectively with substantially radially-extending oppositely-facing complemental pressure fluid sealing surfaces, a gland member arranged in said casing member and axially movable with respect thereto, said gland member normally abutting against the adjacent end of said conduit member, said conduit member and gland member provided with additional complemental sealing surfaces at their zone of abutment, and means for establishing fluid pressure reaction between said casing member and gland member to thereby force the complemental sealing surfaces of said conduit member and gland member, and of said casing member and conduit member, into fluid sealing engagement.

CLIFFORD O. HANSON.